Dec. 13, 1927.
H. C. LORD
JOINT
Filed Nov. 24, 1922
1,652,175
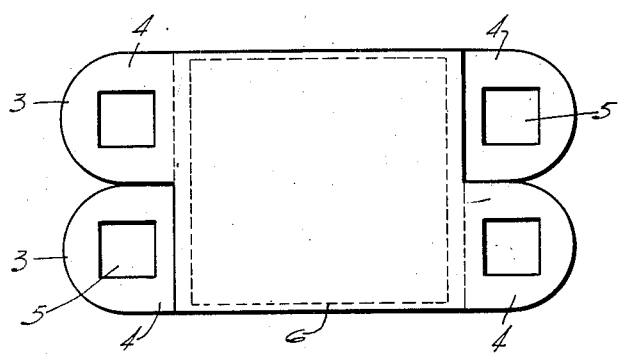
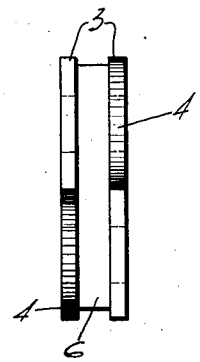
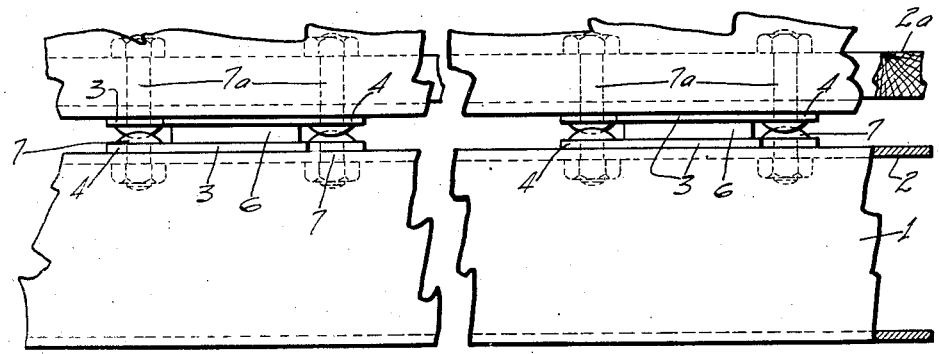
Inventor
Hugh C. Lord Patented Dec. 13, 1927.

1,652,175

UNITED STATES PATENT OFFICE.

HUGH C. LORD, OF ERIE, PENNSYLVANIA.

JOINT.

Application filed November 24, 1922. Serial No. 602,996.

This invention is designed to silence connections between parts having a limited relative movement, as for instance, in the connection between an automobile body and the chassis.

The invention is illustrated in the accompanying drawings as follows:—

Fig. 1 shows a plan view of a joint element.

Fig. 2 an end elevation of the same.

Fig. 3 a side elevation of the completed joint.

1 marks the chassis frame, 2 a flange of a frame channel and 2ª a body sill.

The joint element comprises two metal plates 3—3 each having attaching projections 4 with perforations 5, these perforations being preferably out of round so as to receive the ordinary carriage bolts. A rubber insert 6 is bonded to the opposing surfaces of the plates 3. Bolts 7 extend through the bottom plate and flange 2 and bolts 7ª through the top plate and the sill 2ª.

The projections on the opposing plates are off-set relatively to each other so as to permit the insertion of the bolts through the perforations 5 and also to permit of a sufficient space for the heads of the bolts. The projections on the same plate are on opposite edges and in a line extending through the center of the plate so that the plate as a whole will be anchored to the attached portion by the bolts.

With this joint there is no metallic contact between the body and the chassis, the rubber inserts forming the sole means of connection and these inserts will permit of quite wide lateral movement of the opposing plates and consequently will take up the side slip incident to distortion of the chassis under shock.

The rubber insert may be secured to the surfaces in any desired manner but ordinarily by processes in which the bond is completed by vulcanizing the rubber to the plates. A bond may thus be established having a strength equal at least to that of the intervening rubber.

What I claim as new is:—

1. In a joint unit, the combination of thin, flat joint plates opposingly placed; a thin rubber insert between the plates bonded throughout approximately its entire contacting area to the surfaces of the plates; and clamping means adapted to clamp the plates to directly opposed members to be joined.

2. In a joint, the combination of two opposing joint plates having attaching portions all of which are off-set with relation to each other, said portions being within the dimensions of both plates in one direction; and a rubber insert between the plates bonded to the surfaces of the plates.

3. In a joint, the combination of two opposing joint plates, each plate having a projection at each of two opposite edges, all the projections on one plate being out of alinement relatively to the projections of the opposing plate; and a rubber insert between the plates bonded to the surfaces of the plates.

4. In a joint, the combination of two opposing flat metal joint plates; a rubber insert between the plates bonded throughout approximately its entire contacting surface to the surfaces of the plates; and securing portions symmetrically arranged on each plate.

5. In a joint unit, the combination of two joint plates opposingly placed; a rubber insert between the plates bonded throughout approximately its entire contacting area to the surfaces of the plates; and securing means for each plate, said means being out of alinement in the plane of the plates and overlapping in a direction at right angles to the plane of the plates.

6. In a joint, the combination of members to be joined having overlapping areas; opposing joint plates between the members, one on each member; a rubber insert between the plates bonded throughout approximately its entire contacting area to the surfaces of the plates; and means securing each plate to its member, the means securing one plate to its member being within the overlapping areas.

7. In a joint, the combination of members to be joined having overlapping areas; opposing joint plates between the members, one on each member; a rubber insert between the plates bonded throughout approximately its entire contacting area to the surfaces of the plates, and means securing each plate to its member, the means securing both plates to their members being within the overlapping areas.

8. In a joint, the combination of members to be joined having overlapping areas; opposing joint plates between the members, one on each member; a rubber insert between the plates bonded to the surfaces of the plates; and securing portions on said plates within the overlapping area securing each plate to its member, all said securing portions being off-set with relation to each other.

9. In a joint, for securing automobile bodies to automobile chassis, the combination of a body sill; a frame member under the sill, said sill and member having the same lengthwise direction; metal plates secured to the member and to the sill within the overlapping areas of the sill and member; and a rubber insert bonded throughout approximately its entire contacting area to the surfaces of the plates.

10. In a joint for securing automobile bodies to automobile chassis, the combination of a body sill; a frame member directly under the sill; joint elements comprising metal plates, each plate having attaching projections, said projections being out of alinement relatively to the other projections of said plates; bolts extending through said projections outwardly and from one plate into the sill and from the other plate into the frame; and a rubber insert bonded throughout approximately its entire contacting area to the surfaces of said plates.

In testimony whereof I have hereunto set my hand.

HUGH C. LORD.